3,009,861
ISOLATION OF BACTERIAL SPORES
Gordon Alderton, Orinda, and Lawrence E. Sacks, Berkeley, Calif., assignors to the United States of America as represented by the Secretary of Agriculture
No Drawing. Filed Jan. 13, 1961, Ser. No. 82,655
9 Claims. (Cl. 195—96)
(Granted under Title 35, U.S. Code (1952), sec. 266)

A non-exclusive, irrevocable, royalty-free license in the invention herein described, throughout the world for all purposes of the United States Government, with the power to grant sublicenses for such purposes, is hereby granted to the Government of the United States of America.

This invention relates to and has as its primary object the provision of novel processes for isolating bacterial spores. Further objects and advantages of the invention will be evident from the following description wherein parts and percentages are by weight unless otherwise specified.

In carrying out certain microbiological and biochemical investigations it is necessary to secure bacterial spores in isolated form, that is, free from vegetative cells, cellular debris, or other substances which accompany the spores in such materials as bacterial cultures, soil samples, fruits, vegetables, etc. Isolated bacterial spores are useful, for example, in assaying the activity of germicidal agents, in investigating food spoilage problems, etc.

Various methods are presently employed for isolating bacterial spores, for example, differential sedimentation in water, centrifugation in dense sucrose solutions, froth flotation, etc. In general, these methods are laborious and often are only partially successful in that the spores cannot be completely separated from other particulate material.

In accordance with the invention, bacterial spore-containing substances are treated by a relatively simple procedure which yields the bacterial spores as greatly enriched concentrates, that is, in a condition virtually free from other components of the original substrate. In essence, the process of the invention involves partitioning the spore-containing substance in a liquid-liquid two-phase system containing water, polyethylene glycol, and a salt. Thereby, the spores are preferentially associated with the polyethylene glycol phase of the system and can be readily recovered in a condition virtually free from the other components of the starting material. Typically, the process of the invention is carried out in the following manner.

The spore-containing substance is incorporated with a water-polyethylene glycol-salt system. The mixture is homogenized and then it is allowed to stratify (by gravity or preferably by applying centrifugal action) forming an upper phase rich in polyethylene glycol and a lower phase rich in salt. The spores are suspended in the polyethylene glycol phase whereas the undesired substances—vegetative cells, cellular debris, and other particulate material—are present in the salt phase or at the interface between the phases. The polyethylene glycol phase is removed from the system by decantation or the like and the spores recovered therefrom by centrifugation, filtration, or the other conventional techniques used for separating suspended material from liquids. Usually, it is preferred to dilute the glycol phase with water prior to centrifugation to reduce its viscosity whereby the spores will settle out of suspension more readily.

The invention is of wide versatility and can be employed for isolating bacterial spores from various source materials which contain such spores. The process of the invention may be employed, for example, in isolating bacterial spores from cultures deliberately prepared as a source of the spores. Another field of application lies in isolating naturally occurring bacterial spores from such materials as soils, slimes, etc. The invention may also be applied to such materials as foods and feeds which contain bacterial spores because of adventitious or deliberate microbial action. Taking these items into account typical examples of source materials to which the invention may be applied are bacterial cultures, milk, cultured milks, fruits, vegetables, sauerkraut, meat, fish, cheeses, ensilage, fodder, soils, composts, manures, animal organs or contents thereof, etc.

A particular advantage of the invention is that it exposes the spores only to mild non-denaturing conditions. As a result, the recovered spores are unchanged in their essential characteristics. For example, there is no diminution in viability. Viability studies were made on spores of *B. coagulans* and *B. megaterium* treated in accordance with the invention. It was found that there was no significant difference of viability of these spores as compared to the viability of the same spores which had not been subjected to the treatment of the invention. Also, tests have shown that the treatment of the invention does not alter the thermal resistance of the spores.

Prior to applying the process of the invention, it is advisable to remove water-soluble materials from the spore-containing substance. This may readily be done by conventional techniques. For example, bacterial cultures may be centrifuged to separate the cellular material which is then suspended in water and re-centrifuged. These steps may be repeated several times as necessary to remove water-soluble substances. At times, bacterial cultures will contain substances which exhibit emulsifying properties. It is advisable that in such cases the water washing be carried out to a sufficient degree to remove these substances lest they interfere with the desired separation of the polyethylene glycol and salt phases.

As noted hereinabove, the partitioning system contains water, a salt, and a polyethylene glycol. Polyethylene glycols of various molecular weights can be used, for example, those having a molecular weight from 300 to 20,000. In cases where it is desired to employ centrifugation to facilitate phase separation, it is preferred to use the polyethylene glycols of higher molecular weight within the above range. A typically useful polyethylene glycol in this category is the commercial product having an average molecular weight of 3000 to 3700, sold under the name Carbowax-4000. The polyethylene glycols of higher molecular weight form an upper phase of sufficient viscosity to keep the bacterial spores suspended and hence to prevent them from migrating to the interface or the lower (salt-water) phase even if centrifugal force is applied to the system to facilitate stratification of the phases. As the salt, one may use any water-soluble salt which is not deleterious to the spores to be isolated and which furnishes sufficiently high ionic concentration to cause phase separation. Typical compounds which may be used as alkali-metal or ammonium phosphates or sulphates; magnesium sulphate, magnesium chloride, etc. It is believed that the salt acts as a salting-out agent enabling the separation of a phase rich in polyethylene glycol from the system. Accordingly, the chemical nature of the salt is not critical to the process. Generally alkali-metal phosphates are preferred as they exhibit a potent salting-out effect. In preparing the partitioning system it is simply necessary to combine the three components—salt, polyethylene glycol, and water. The relative amounts of these agents is not critical and may be varied depending on the particular polyethylene glycol and salt selected. In any event, it is desired that the system stratify on standing or centrifugation to form a two-phase system—one being rich in polyethylene glycol and the other being rich in the salt, that is, an aqueous solution containing most of the salt and a small proportion of the polyethylene glycol. It is obvious that where a polyethylene glycol of low molecular weight is used, a higher proportion of salt needs to be used than in a situation where a polyethylene glycol of higher molecular weight (lesser water-solubility) is used. Suitable proportions can be determined by making pilot trials using different proportions of polyethylene glycol and salt, noting which mixtures on standing produce a two-phase system. For best results, it is preferred that the proportions of material being treated and partitioning system be so selected that there will be not over 10 to 20 mg. of spores per ml. of polyethylene glycol phase after stratification.

The pH of the partitioning system plays no part in the separation of spores but it may be desired to adjust this factor by conventional methods so that the spores will not be inactivated by undue acidity or alkalinity. Usually, it is preferred to use a pH of about neutrality.

In many cases the bacterial spores occur in the substance to be treated in a form wherein they are more or less agglomerated with other cellular material, for example, sporangia. For this reason it is preferred that when the substance is added to the partitioning system a substantial degree of mixing, blending, homogenization, or other form of agitation be applied to break up these agglomerates and release single spores from each other and from the other cellular material. In the alternative, such action may be applied to the substance before it is added to the partitioning system.

In cases where it is desired to extract from a substance the maximum amount of spores in a purified condition, it is preferred that the partitioning process be applied successively several times. Thus, in the first application of the process, the substance to be treated is partitioned in the system as described. The polyethylene glycol phase is removed and saved. To the remaining material is added a quantity of equilibrated blank polyethylene glycol phase to bring it back to the original volume. This mixture is re-homogenized, then centrifuged to stratify it. The new polyethylene glycol phase is removed and replaced with equilibrated material, etc. These successive partitionings are repeated until the point is reached when the polyethylene glycol phase remains clear, indicating that no more spores are present. The several polyethylene glycol phases which have been successively removed are combined, diluted with water, and centrifuged to collect the isolated spores. This procedure is demonstrated below in Example III. It is noticed that in some cases, depending on the type of spores and the history of the substance being treated, some of the spores will collect at the interface between the polyethylene glycol and salt phases. Generally, this material contains spores mechanically attached to cell structures such as sporangial skeletons. By applying the repeated homogenizing and partitioning, the spores can be removed from the interface and collected in the polyethylene glycol in a condition free from other cellular material. This point illustrates a unique facet of the present process, in that the spores which appear in the polyethylene glycol phase are, in most cases, pure single spores with no attached sporangial skeletons or other cellular fragments.

It is to be observed that the process of the invention does not depend on density differences. That is, the separation is not achieved through a separation of particles due to their different densities as is the case in some prior processes. Although in the present system the salt phase is denser than the polyethylene glycol phase, the particles are not partitioned on this basis. In fact, in many instances bacterial spores are denser than the other components of a culture, yet they are associated with the polyethylene glycol (the less dense) phase. Actually, it is believed that the isolation technique of the invention is dependent on a difference in surface characteristics or surface attraction. Thus, the spores are attracted to the polyethylene glycol phase which is the less hydrophilic of the two phases, whereas vegetative cells, cell debris, etc., is attracted to the salt-water phase which is the more hydrophilic phase.

Although the process of the invention is usually employed for isolating bacterial spores from vegetative cells, etc., it can obviously be applied for the aim of isolating vegetative cells from spores. Thus, for instance, bacterial cultures may be treated by the process of the invention to obtain isolated vegetative cells, free from spores. In such application of the invention the process is applied as previously described except that the salt phase and/or the interface between the phases are recovered and the vegetative cells separated therefrom by centrifugation or the like.

The process of the invention can also be applied to isolate spore coats. Thus when spores germinate, the spore coats are ruptured and shed and it is desired to isolate these coats for the purpose of investigating their chemical and physical properties. A typical application of the invention to isolate spores coats is as follows: Bacterial spores are isolated from a culture as described herein. The isolated spores are placed in a conventional germinating medium and allowed to germinate. The resulting material is then subjected to the process of the invention and it is found that the spore coats are present in the polyethylene glycol phase whereas the vegetative cells, cellular debris, etc., are in the salt phase or at the interface. The polyethylene glycol phase is separated and the spore coats isolated therefrom by centrifuging, preferably diluting the glycol phase with water prior to applying centrifugation. Instead of applying germination to release the spore coats from the contents of the spores, one can use other techniques. For example, isolated spores may be ground in the presence of abrasive particles or the spores may be subjected to extended autoclaving. Either process causes a rupture of the spores and on applying the separation process of the invention to the products the spore coats may be isolated, essentially free from other bacterial material.

The invention is further demonstrated by the following illustrative examples.

The polyethylene glycol used in the examples was a commercial product having an average molecular weight of 3000 to 3700.

The phosphate solution used in the examples was an aqueous solution containing 1.76 moles $K_2HPO_4$ plus 1.24 moles $KH_2PO_4$ per liter; its pH was 7.1.

*Example I*

A medium was prepared containing the following ingredients.

| Component: | Amount, grams |
|---|---|
| Beef extract | 5 |
| Peptone | 10 |
| Glucose | 5 |
| $(NH_4)_2PO_4$ | 2.1 |
| $Na_2SO_4$ | 0.8 |
| KCl | 0.8 |
| $Ca(NO_3)_2.4H_2O$ | 0.118 |
| $MnCl_2.4H_2O$ | 0.181 |
| $MgCl_2.6H_2O$ | 0.418 |
| $FeCl_3.6H_2O$ | 0.242 |
| $ZnCl_2$ | 0.0105 |
| $CoCl_2.6H_2O$ | 0.0081 |
| Water, sufficient to make 1 liter. | |

*Bacillus megaterium* NRRL B–938 was grown on the above medium at 35° C. with agitation and aeration. After 44 hours the culture was harvested by centrifuging it. The cellular material so recovered was washed with distilled water then suspended in sufficient water to produce a suspension having an optical density of 1.0.

A mixture was made containing polyethylene glycol (10.56 g.), phosphate solution (33.9 ml.) and sufficient of the above bacterial suspension to give a total volume of 100 ml. Thorough agitation was applied and then the mixture was allowed to stand to stratify. It was observed that there was formed an upper polyethylene glycol phase and a lower salt-water phase. Examination of the individual phases showed that the upper phase contained the *B. megaterium* spores with less than 1% vegetative cells and cellular debris. The lower phase and the interface contained only vegetative cells and cellular debris.

*Example II*

A culture of *Bacillus cereus* was harvested well before sporulation had commenced, washed three times with distilled water and mixed with a suspension of purified *B. cereus* spores to give approximately equal numbers of vegetative cells and spores.

Ethylene glycol (11.18 g.) and phosphate solution (34.1 ml.) were incorporated with sufficient of the bacterial suspension to give a total volume of 100 ml. The mixture was thoroughly agitated, then allowed to stand to form the two phases. Examination of the upper phase showed that it contained the *B. cereus* spores with virtually no vegetative cells or cell debris.

*Example III*

A 42-hour culture of *Bacillus subtilis* was centrifuged to harvest the spores and vegetative cells. This cellular material was subjected to successive washing and centrifuging to remove water-soluble components. The washed cellular material was suspended in water, passed through a homogenizer, and diluted with sufficient water to provide a suspension having an optical density of 1.0.

Polyethylene glycol (11.18 g.) and phosphate solution (34.1 ml.) were incorporated with sufficient of the above bacterial suspension to provide a total volume of 100 ml. Thorough agitation was applied and the mixture was centrifuged. The upper (polyethylene glycol) phase was removed and saved. To the residual material was added equilibrated polyethylene glycol to bring the volume back to 100 ml. This preparation was thoroughly agitated, then centrifuged. The upper layer was removed, saved for further use, and replaced by fresh equilibrated polyethylene glycol as before. In this way a total of six partitionings were carried out. The several upper layers were combined, diluted with water, and centrifuged to give a good yield of *B. subtilis* spores in a condtiion free from any other cellular material.

The equilibrated polyethylene glycol was prepared as follows. Polyethylene glycol (11.18 g.), phosphate solution (34.1 ml.) and sufficient water to give a total volume of 100 ml. were thoroughly mixed and allowed to stand. The upper (polyethylene glycol) phase was drawn off and constituted the "equilibrated polyethylene glycol."

*Example IV*

A liver broth culture of *Clostridium botulinum* type E was procured. Examination of this culture showed that it had sporulated only to the extent of 1%.

The culture was centrifuged and washed and the cellular material treated as described in Example I. Examination of the polyethylene glycol phase revealed only free spores.

*Example V*

Two grams of field-dried horse manure was ground in a homogenizer with 10 ml. of water, preventing undue temperature rise with an ice bath. The homogenate and rinsings were combined and diluted to 50 ml. This suspension was filtered through glass wool and partitioned two times using the system: Polyethylene glycol (11.18 g.), phosphate solution (34.1 ml.) and sufficient suspension to give a total volume of 100 ml. The upper phases were combined and found to contain only spores and what appeared to be one species of vegetative cell.

*Example VI*

Peat soil (0.7 g.) was homogenized with water and subjected to two successive partitionings as in Example V. Microscopic examination of the second upper phase showed only spores and very finely-divided mineral matter but no vegetative cells or other microorganisms.

Having thus described the invention, what is claimed is:

1. A process for isolating spores which comprises incorporating a substance containing bacterial spores into a liquid two-phase system of water, polyethylene glycol, and a water-soluble salt, stratifying the mixture to form a phase rich in polyethylene glycol and a phase rich in salt, the bacterial spores being concentrated in said first-mentioned phase, separating said first-mentioned phase from the system, and removing the spores therefrom.

2. The process of claim 1 wherein the substance containing bacterial spores is a bacterial culture.

3. The process of claim 1 wherein the substance containing bacterial spores is soil.

4. The process of claim 1 wherein the substance containing bacterial spores is animal excreta.

5. A process for isolating bacterial spores from a substance containing bacterial spores which comprises separating particulate material from the substance, washing the particulate material to remove water-soluble components, incorporating the washed particulate material into a two-phase system of water, polyethylene glycol, and a water-soluble salt, stratifying the mixture to form a phase rich in polyethylene glycol and a phase rich in salt, the spores being concentrated in said first-mentioned phase, separating said first-mentioned phase and recovering the spores therefrom.

6. A process for isolating bacterial spores from a bacterial culture containing spores which comprises separating cellular material from the culture, washing the cellular material to remove water-soluble components, incorporating the washed cellular material into a two-phase system of water, polyethylene glycol, and a water-soluble salt, stratifying the mixture to form a phase rich in polyethylene glycol and a phase rich in salt, the spores being concentrated in said first-mentioned phase, separating the said first-mentioned phase and recovering the spores therefrom.

7. A process for isolating vegetative cells from a substance containing bacterial vegetative cells and spores which comprises incorporating the substance into a two-phase system of water, polyethylene glycol, and a water-soluble salt, stratifying the mixture to form a phase rich in polyethylene glycol and a phase rich in salt, the bacterial spores being concentrated in the first-mentioned phase, the vegetative cells being concentrated in the remainder of the system, removing the said first-mentioned phase, and isolating the vegetative cells from the residual portion of the system.

8. A process for isolating bacterial spore coats which comprises exposing bacterial spores to conditions conducive to rupture of the spores, incorporating the resulting material into a two-phase system of water, polyethylene glycol, and a water-soluble salt, stratifying the mixture to form a phase rich in polyethylene glycol and a phase rich in salt, the spore coats being concentrated in the first-mentioned phase, separating the first-mentioned phase from the system, and removing the spore coats therefrom.

9. A process for isolating bacterial spore coats which comprises exposing bacterial spores to germinating conditions to cause the spore coats to be ruptured and shed, incorporating the resulting material into a two-phase system of water, polyethylene glycol, and a water-soluble salt, stratifying the mixture to form a phase rich in polyethylene glycol and a phase rich in salt, the spore coats being concentrated in the first-mentioned phase, separating the first-mentioned phase from the system, and recovering the spore coats therefrom.

No references cited.